United States Patent
Joege et al.

(10) Patent No.: US 10,717,110 B2
(45) Date of Patent: Jul. 21, 2020

(54) AQUEOUS DISPERSION OF AT LEAST TWO POLYMERIC RESINS AND AQUEOUS COATING COMPOSITION COMPRISING SAME FOR APPLYING A TOPCOAT

(71) Applicant: BASF Coatings GmbH, Muenster (DE)

(72) Inventors: Frank Joege, Sendenhorst (DE); Dominik Vollmann, Warendorf (DE); Joerg Ressel, Muenster (DE); Lara Schwarzenberg, Muenster (DE)

(73) Assignee: BASF Coatings GmbH, Muenster (DE)

( * ) Notice: Subject to any disclaimer, the term of this patent is extended or adjusted under 35 U.S.C. 154(b) by 377 days.

(21) Appl. No.: 15/310,640

(22) PCT Filed: May 13, 2015

(86) PCT No.: PCT/EP2015/060683
§ 371 (c)(1),
(2) Date: Nov. 11, 2016

(87) PCT Pub. No.: WO2015/173348
PCT Pub. Date: Nov. 19, 2015

(65) Prior Publication Data
US 2017/0081548 A1 Mar. 23, 2017

(30) Foreign Application Priority Data
May 14, 2014 (EP) .................................... 14168232

(51) Int. Cl.
| | | |
|---|---|---|
| *C08G 18/10* | (2006.01) | |
| *B05D 7/00* | (2006.01) | |
| *C09D 167/02* | (2006.01) | |
| *C08G 18/68* | (2006.01) | |
| *C08F 283/00* | (2006.01) | |
| *B05D 3/00* | (2006.01) | |
| *B05D 3/10* | (2006.01) | |

(52) U.S. Cl.
CPC .............. *B05D 7/50* (2013.01); *B05D 3/002* (2013.01); *B05D 3/108* (2013.01); *C08F 283/008* (2013.01); *C08G 18/10* (2013.01); *C08G 18/68* (2013.01); *C09D 167/02* (2013.01)

(58) Field of Classification Search
None
See application file for complete search history.

(56) References Cited

U.S. PATENT DOCUMENTS

| | | | |
|---|---|---|---|
| 3,300,447 A * | 1/1967 | Thoma | C08G 63/16 525/439 |
| 5,334,420 A | 8/1994 | Hartung et al. | |
| 6,001,915 A | 12/1999 | Schwarte et al. | |
| 6,822,038 B1 | 11/2004 | Gross et al. | |
| 2005/0255330 A1* | 11/2005 | Meyer | C08G 63/20 428/480 |

FOREIGN PATENT DOCUMENTS

| | | |
|---|---|---|
| DE | 40 09 858 A1 | 10/1991 |
| DE | 40 10 176 A1 | 10/1991 |
| EP | 0 562 329 A2 | 9/1993 |
| WO | WO 91/15528 A1 | 10/1991 |
| WO | WO 96/12747 A1 | 5/1996 |
| WO | WO 01/04222 A1 | 1/2001 |
| WO | WO 2006/079628 A2 | 8/2006 |
| WO | WO 2009/100938 A1 | 8/2009 |
| WO | WO 2009/115504 A1 | 9/2009 |

OTHER PUBLICATIONS

Solomon et al., Reactivity of Functional Groups in Surface Coating Polymers. Part I. Hydroxyl Groups in Alkyd Resins, Journal of Applied Polymer Science, vol. 10, 1966, pp. 981-991 (Year: 1966).*
International Search Report and Written Opinion of the International Searching Authority dated Aug. 17, 2015 in PCT/EP2015/060683.
International Preliminary Report on Patentability dated Nov. 15, 2016 in PCT/EP2015/060683 filed May 13, 2015.

* cited by examiner

*Primary Examiner* — Francisco W Tschen
(74) *Attorney, Agent, or Firm* — Oblon, McClelland, Maier & Neustadt, L.L.P.

(57) ABSTRACT

The present invention relates to an aqueous dispersion (P) of at least two polymeric resins (P1) and (P2) which are different from one another, (P1) being a copolymer obtainable by copolymerizing ethylenically unsaturated monomers in the presence of at least one polyurethane resin having polymerizable carbon double bonds, and (P2) being a polyester having functional hydroxyl groups, which has an acid number of <25 mg of KOH per g of polyester, and (P) being obtainable by a process encompassing at least four steps (1), (2), (3), and (4), to an aqueous coating composition comprising the aqueous dispersion (P), to a process for at least partly coating at least one substrate metal surface, coated with at least one primer coat, with a topcoat, using the aqueous coating composition, and to an at least partly coated substrate obtainable by such a process.

20 Claims, No Drawings

AQUEOUS DISPERSION OF AT LEAST TWO POLYMERIC RESINS AND AQUEOUS COATING COMPOSITION COMPRISING SAME FOR APPLYING A TOPCOAT

The present invention relates to an aqueous dispersion (P) of at least two polymeric resins (P1) and (P2) which are different from one another, (P1) being a copolymer obtainable by copolymerizing ethylenically unsaturated monomers in the presence of at least one polyurethane resin having polymerizable carbon double bonds, and (P2) being a polyester having functional hydroxyl groups, which has an acid number of <25 mg of KOH per g of polyester, and (P) being obtainable by a process encompassing at least four steps (1), (2), (3), and (4), to an aqueous coating composition comprising the aqueous dispersion (P), to a process for at least partly coating at least one substrate metal surface, coated with at least one primer coat, with a topcoat, using the aqueous coating composition, and to an at least partly coated substrate obtainable by such a process.

For the production of flat and thin-walled metallic components such as, for example, automobile components and bodywork components, but also corresponding components from the sector of equipment casings, façade sheeting, ceiling claddings, or window profiles, suitable metal sheets such as steel or aluminum sheets, for example, are shaped by means of conventional technologies such as punching and/or drilling. Larger metallic components may be assembled by welding together a number of individual parts. Commonly in use as raw material for producing such components are long metal strips, which are produced by rolling of the metal in question and which, for the purpose of storage and for greater ease of transport, are wound up to form rolls ("coils").

The stated metallic components must commonly be protected against corrosion. In the automobile sector in particular, the corrosion prevention requirements are very high, especially since the manufacturers often offer a guarantee against rust penetration for many years.

This anticorrosion treatment may be carried out on the completed metallic component, such as an automobile body welded together, for example. Increasingly, however, the anticorrosion treatment is nowadays undertaken at an earlier point in time, namely on the actual metal strips used for producing these components, as part of the coil coating process.

Coil coating is the continuous, single- or double-sided coating of flat rolled metal strips, such as of steel or aluminum strips, for example, with usually liquid coating compositions at speeds of approximately 60 to 200 m/min. This coil coating normally takes place in roll application with counterrotating rolls. After the coil coating process has been carried out, the metal strips generally have a number of different paint coats, of which at least one is responsible for sufficient corrosion protection. Normally, after an optional cleaning step for the metal strip and after application of a thin pretreatment coat, a coat of primer is applied to the pretreatment coat, followed by the application of at least one topcoat to the primer coat (2-step application). Alternatively, instead of the successive application of the pretreatment coat and of the primer, it is also possible for a total of only one primer coat to be applied, this coat representing a combination of a pretreatment and primer coat applied in the 2-step application to the in that case at least one topcoat (1-step application). A coil coating process known from the prior art is disclosed in WO 2006/079628 A2, for example. Given that the (further) metal processing of the metal strips thus coated does not usually take place until after painting by means of the coil coating process, the coating materials employed for this purpose, especially topcoat materials, are required to exhibit very high mechanical stability and also, according to intended use, very high weather resistance and/or chemical resistance, particularly in view of the fact that they are often used in the outdoor sector.

A disadvantage of the liquid coating compositions typically used in the coil coating process particularly for the application of at least one topcoat is the presence therein of organic solvents, more particularly the presence therein of relatively nonvolatile organic solvents. The presence of these organic solvents is necessary commonly in order to prevent any incidence of pop marks, i.e., any incidence of bubbles—still closed or already burst—within the respective coat to be applied. Such pop marks may be brought about in the course of drying and/or baking of the respective coat, more particularly of the topcoat, as a result of excessively rapid evaporation of solvents or elimination products from the chemical crosslinking, and for this reason the respective coating compositions are typically admixed with relatively nonvolatile organic solvents, examples being long-chain alcohols such as dodecyl alcohol, long-chain glycols, aromatic compounds, or alkanes, in order to prevent popping—although this is objectionable on environmental grounds. The presence of commonly employed organic solvents is necessary, moreover, in order to ensure effective wetting and hence good adhesion properties of the resulting coat, more particularly topcoat, to the underlying coating such as a primer coat. Furthermore, the presence of organic solvents used, particularly in the coating compositions used for preparing topcoat compositions, is normally necessary because purely aqueous conventional coating compositions, comprising conventional binders employable in aqueous systems, do not ensure sufficient temperature stability, chemical resistance and water resistance and/or sufficient UV stability in the resultant topcoats.

There exists, however, a need for liquid coating compositions which can be used in a process such as the coil coating process, more particularly for production of the topcoat, which are more environmentally benign than the compositions commonly employed—that is, are substantially free of organic solvents, more particularly of relatively nonvolatile organic solvents—but are nevertheless suitable for preventing the incidence of pop marks. There is a need, furthermore, for coating compositions of this kind which are suitable for producing coatings such as topcoats, these coatings exhibiting no disadvantages in terms of temperature stability and/or UV stability and also adhesion properties relative to conventionally employed solventborne coating compositions.

It is an object of the present invention, therefore, to provide a liquid coating composition which is suitable particularly for producing a topcoat by the coil coating process and which, moreover, exhibits a corrosion protection-improving effect. It is an object of the present invention more particularly to provide a liquid coating composition of this kind which exhibits no disadvantages and more particularly exhibits advantages relative to conventional liquid coating compositions employed in the coil coating process for producing a topcoat. It is an object of the present invention in particular, moreover, to provide a liquid coating composition of this kind which is more environmentally benign, being more particularly substantially free from organic solvents, than the compositions commonly employed, but which is nevertheless at least equally suitable for preventing the incidence of surface defects such as pop marks, especially when the desire is for topcoats which exhibit a dry film thickness of not more than 25 µm or of not more than 20 µm. It is a further object of the present invention, in particular, to provide a liquid coating composition of this kind which can be used for producing coatings such as topcoats that exhibit no disadvantages in terms of the ingress of UV light and/or of exposure to high or very low temperatures, and which are not easily detachable from the underlying primer.

This object is achieved by means of an aqueous dispersion (P) of at least two polymeric resins (P1) and (P2) which are different from one another,
the polymeric resin (P1) being a copolymer obtainable by copolymerization of ethylenically unsaturated monomers in the presence of at least one polyurethane resin having polymerizable carbon double bonds, and
the polymeric resin (P2) being a polyester having functional hydroxyl groups and having an acid number of <25 mg of KOH per g of polyester,
wherein the aqueous dispersion (P) is obtainable by a process comprising at least steps (1), (2), (3), and (4):
(1) preparing a dispersion or solution of the at least one polymeric resin (P1) in at least one organic solvent,
(2) preparing a mixture of the dispersion or solution obtained by step (1) and of a melt or solution of the at least one polymeric resin (P2),
(3) adding water to the mixture obtained by step (2), and
(4) removing the organic solvent from the mixture obtained by step (3), to give the aqueous dispersion (P).

The present invention accordingly first provides an aqueous dispersion (P) of this kind, of the invention, of at least two polymeric resins (P1) and (P2) which are different from one another.

It has surprisingly been found that an aqueous dispersion (P) of this kind is suitable as part of a binder component in an aqueous coating composition which can be employed in particular for applying a topcoat to suitable substrates.

More particularly it has surprisingly been found that the process used for preparing the aqueous dispersion (P) of the invention and comprising at least steps (1), (2), (3), and (4) makes it possible to provide the polymeric resin (P2), which was hitherto used exclusively as part of a binder component in conventional solventborne coating compositions suitable for producing topcoats—in the coil coating process, for example—in combination with the polymeric resin (P1), for use, as well, as a binder component in aqueous coating compositions.

It has, moreover, surprisingly been found that only the stated process steps (1) to (4) allow a homogenous aqueous dispersion of the polymeric resins (P1) and (P2) to be provided.

The present invention accordingly further provides an aqueous coating composition comprising
(A1) at least the aqueous dispersion (P) of the invention of at least two polymeric resins (P1) and (P2) which are different from one another,
(A2) at least one crosslinking agent,
(A3) at least one pigment, and
(A4) optionally at least one additive
for at least partly coating at least one substrate metal surface, coated with at least one primer coat, with a topcoat.

The aqueous coating composition of the invention is therefore preferably a topcoating composition which is used preferably for at least partly coating at least one substrate metal surface, coated with at least one primer coat, with a topcoat by the coil coating process.

By virtue of the components (A1) and (A2) it comprises, the coating composition of the invention comprises at least one binder (A). This binder (A) comprises more particularly the at least one crosslinking agent (A2) and the at least two polymeric resins (P1) and (P2) present in the aqueous dispersion (P) used as component (A1).

It has surprisingly been found that the aqueous coating composition of the invention is suitable, more particularly in the coil coating process, for at least partly coating at least one substrate metal surface, coated with at least one primer coat, with a topcoat.

It has further been surprisingly found that the specific constituents of the coating composition of the invention, particularly by virtue of the presence of component (A1) in the aqueous coating composition, make it possible to prevent the incidence of surface defects within the applied coat, such as of pinholes or pop marks, for example, more particularly of pop marks.

More particularly it has been surprisingly found that no such popping occurs although the coating composition of the invention is an aqueous coating composition, in other words a composition of the kind which is substantially free from organic solvents, despite the fact that normally it is necessary to employ exactly such conventional solventborne coating compositions in order to prevent such popping.

It has surprisingly been found, moreover, that the aqueous coating composition of the invention is notable for high wet adhesive strength and for a corrosion protection-improving effect. Generally speaking, moreover, the coating composition of the invention is notable for being aqueous and hence more environmentally benign than conventional coating compositions comprising organic solvents.

It has further emerged, surprisingly, that the aqueous coating composition of the invention allows the provision of topcoats having the above-described advantageous properties, more particularly without popping, in dry film thicknesses of in particular up to a maximum of 25 m or up to a maximum of 20 µm, such as in a range from 10 to 25 µm or in a range from 10 to 20 µm, for example, in particular by the coil coating process.

It has further been surprisingly found, moreover, that the aqueous coating composition of the invention is suitable for producing coatings such as topcoats, with the resultant coating being notable for effective adhesion properties to the underlying coat such as a primer coat and being notable, furthermore, for good gloss. The resultant coating is additionally notable for good temperature stability and/or UV stability.

The terms "pop marks", "pinholes", "wet adhesive strength", "flow defects", "coil coating", and "coil coating materials" are known to the skilled person and defined for example in Römpp Lexikon, Lacke und Druckfarben, Georg Thieme Verlag 1998.

The term "comprising" in the sense of the present invention, in connection for example with the aqueous dispersion (P) of the invention and with the aqueous coating composition of the invention, has in one preferred embodiment the meaning of "consisting of". In this case, with regard to the aqueous dispersion (P) of the invention, in this preferred embodiment, besides the components water, (P1), and (P2), there may be one or more of the further components present that are identified below and are optionally present in the aqueous dispersion (P) of the invention, such as (A4), for example. In that case, with regard to the aqueous coating composition of the invention, in this preferred embodiment, as well as components (A1), (A2), and (A3), there may optionally, furthermore, be (A4) and/or further water present in the coating composition of the invention. All of the components, in each case in one of their preferred embodiments as specified below, may be present in the coating composition of the invention and/or in the aqueous dispersion (P) of the invention.

The fractions in wt % for the polymeric resins (P1) and (P2) and also water, present in the aqueous dispersion (P) of the invention add up preferably to 100 wt %, based on the total weight of the aqueous dispersion (P).

The fractions in wt % of the components (A1), (A2), (A3), and optionally (A4), and also water, present in the coating composition of the invention add up preferably to 100 wt %, based on the total weight of the coating composition.

The aqueous dispersion (P) of the invention and the aqueous coating composition of the invention each comprise water as liquid diluent.

The term "aqueous" in connection with the aqueous dispersion (P) of the invention and with the coating composition of the invention refers preferably to those dispersions (P) and coating compositions, respectively, which as liquid diluent—i.e., as liquid solvent and/or dispersion medium—comprise water as the main component and are therefore at least substantially free of organic solvents. Optionally, however, the dispersions (P) of the invention and the coating compositions of the invention may include at least one organic solvent in small fractions. Examples of such organic solvents include heterocyclic, aliphatic, or aromatic hydrocarbons, mono- or polyfunctional alcohols, ethers, esters, ketones, and amides, such as N-methylpyrrolidone, N-ethylpyrrolidone, dimethyl-formamide, toluene, xylene, butanol, ethyl glycol and butyl glycol, and also their acetates, butyl diglycol, diethylene glycol dimethyl ether, cyclohexanone, methyl ethyl ketone (MEK), methyl isobutyl ketone (MIBK), acetone, isophorone, or mixtures thereof, for example, more particularly methyl ethyl ketone (MEK) and/or methyl isobutyl ketone (MIBK). The fraction of these organic solvents is preferably not more than 20.0 wt %, more preferably not more than 15.0 wt %, very preferably not more than 10.0 wt %, more particularly not more than 5.0 wt % or not more than 4.0 wt % or not more than 3.0 wt %, even more preferably not more than 2.5 wt % or not more than 2.0 wt % or not more than 1.5 wt %, most preferably not more than 1.0 wt % or not more than 0.5 wt %, based in each case on the total fraction of the liquid diluents, i.e., liquid solvents and/or dispersion media, that are present in the aqueous dispersion (P) of the invention or in the coating composition of the invention, respectively. More particularly, however, there are no organic solvents in the aqueous dispersion (P) of the invention and in the coating composition of the invention—that is, the dispersion (P) of the invention and the coating composition of the invention comprise water as sole diluent.

Aqueous Dispersion (P)

The aqueous dispersion (P) of the invention is obtainable by a process comprising at least steps (1), (2), (3), and (4):
(1) preparing a dispersion or solution, preferably dispersion, of the at least one polymeric resin (P1) in at least one organic solvent,
(2) preparing a mixture of the dispersion or solution, preferably dispersion, obtained by step (1) and of a melt or solution, preferably melt, of the at least one polymeric resin (P2),
(3) adding water to the mixture obtained by step (2), and
(4) removing the organic solvent from the mixture obtained by step (3), to give the aqueous dispersion (P).

The process preferably further comprises a step (2a), carried out between steps (2) and (3), in the form of an at least partial neutralizing of the intermediate obtained by step (2), by the addition of at least one neutralizing agent such as, for example, of at least one suitable amine, optionally containing OH groups, it being possible for this amine to carry 1 to 12 carbon atoms, for example. Dimethylethanolamine is one example of such an amine.

Step (1) can be carried out using, in principle, any suitable organic solvent. Examples of such organic solvents include heterocyclic, aliphatic, or aromatic hydrocarbons, mono- or polyfunctional alcohols, ethers, esters, ketones, and amides, such as N-methyl-pyrrolidone, N-ethylpyrrolidone, dimethylformamide, toluene, xylene, butanol, ethyl glycol and butyl glycol, and also their acetates, butyl diglycol, diethylene glycol dimethyl ether, cyclohexanone, methyl ethyl ketone (MEK), methyl isobutyl ketone (MIBK), acetone, isophorone, or mixtures thereof, for example, more particularly methyl ethyl ketone (MEK) and/or methyl isobutyl ketone (MIBK).

Step (1) and/or step (2) and/or step (2a) is carried out preferably at a temperature in the range from 60 to 180° C., more particularly at a temperature in the range from 90 to 150° C.

In step (2), preferably, the dispersion or solution obtained by step (1) is taken initially and is admixed with the melt or solution, preferably melt, of the at least one polymeric resin (P2). Where a solution of the at least one polymeric resin (P2) is used in step (2), this is preferably a solution of (P2) in at least one organic solvent.

Step (3) preferably uses deionized water. The mixture obtained by step (3) is preferably a dispersion.

Step (4) may be accomplished for example by application of reduced pressure or by distillative removal at elevated temperature and/or in vacuum. Because of the solvent-containing dispersion or solution used in step (1), the aqueous dispersion (P) obtained by step (4) may possibly include a small fraction of organic solvent such as MEK and/or MIBK, for example, though this fraction is situated at most in a range from 0.2 to 1.5 wt %, preferably from 0.2 to 1.0 wt %, more preferably from 0.2 to 0.6 wt %, based in each case on the total weight of the aqueous dispersion (P).

The relative weight ratio of the polymeric resins (P1) and (P2) to one another in the aqueous dispersion (P), based in each case on their solids content, is preferably in a range from 5:1 to 1:5, more preferably in a range from 4:1 to 1:4, very preferably in a range from 3:1 to 1:3, especially preferably in a range from 2:1 to 1:2, even more preferably in a range from 1.5:1 to 1:1.5 or in a range from 1.2:1 to 1:1.2.

The aqueous dispersion (P) of the invention preferably has a solids content in the range from 30 to 80 wt %, more preferably from 35 to 75 wt %, very preferably from 40 to 70 wt %, especially preferably from 40 to 65 wt %, based in each case on the total weight of the dispersion (P).

The aqueous dispersion (P) of the invention is preferably a homogeneous dispersion. The particles contained in the aqueous dispersion (P) of the invention preferably have an average particle diameter in the range from 100 to 500 nm, more preferably from 150 to 400 nm, very preferably from 150 to 250 nm. The figure in question is the average particle diameter based on the sample volume ($D_{50}$-median value), determined by means of the Mastersizer 2000 instrument from Malvern Instruments Ltd, UK, by laser diffraction in ethanol.

Polymeric Resin P1

The polymeric resin (P1) is a copolymer which is obtainable by copolymerization of ethylenically unsaturated monomers in the presence of at least one polyurethane resin having polymerizable carbon double bonds. Such copolymers are known for example from WO 91/15528 A1 and may therefore be easily prepared by the skilled person.

The polymeric resin (P1) used for preparing the aqueous dispersion (P) of the invention is preferably a polymeric resin (P1) in dispersion or solution in at least one organic solvent. A corresponding dispersion of such a polymeric resin (P1) preferably has a nonvolatile fraction, i.e., a solids fraction, in the range from 35 to 80 wt %, more preferably in the range from 40 to 75 wt %, very preferably in the range from 45 to 75 wt %, most preferably in the range from 50 to 70 wt %, based in each case on the total weight of the dispersion.

The polymeric resin (P1) preferably has a weight-average molecular weight of 2000 to 100 000 g/mol, more preferably of 5000 to 80 000 g/mol, very preferably of 15 000 to 60 000 g/mol, more particularly of 30 000 to 55 000 g/mol or of 35 000 to 50 000 g/mol. The method for determining the weight-average molecular weight is described hereinafter.

The polymeric resin (P1) preferably has a number-average molecular weight of 100 to 50 000 g/mol, more preferably of 1000 to 40 000 g/mol, very preferably of 2500 to 25 000 g/mol, more particularly of 3000 to 20 000 g/mol or of 4000 to 15 000 g/mol. The method for determining the number-average molecular weight is described hereinafter.

The polymeric resin (P1) preferably has an acid number of 5 to 200, more preferably of 10 to 150, very preferably of 15 to 100, more particularly of 20 to 50 or of 25 to 40, mg of KOH per g of polymeric resin (P1). The method for determining the acid number is described hereinafter.

The polymeric resin (P1) used in accordance with the invention preferably has functional OH groups. The polymeric resin (P1) preferably has an OH number (hydroxyl number) of 5 to 100, more preferably of 10 to 90, very preferably of 20 to 80, more particularly of 30 to 70 or of 40 to 60, mg of KOH per g of polymeric resin (P1). The method for determining the hydroxyl number is described hereinafter.

The polyurethane resin having polymerizable carbon double bonds that is used for preparing the polymeric resin (P1) preferably has on average per molecule 0.05 to 1.1, preferably 0.2 to 0.9, more preferably 0.3 to 0.7 polymerizable carbon double bonds. It is preferred for the polyurethane resin used for preparing the polymeric resin (P1) to have an acid number of 0 to 2 mg of KOH per g of polyurethane resin.

The polyurethane resin having polymerizable carbon double bonds that is used for preparing the polymeric resin (P1) is preferably at least obtainable by reaction of at least one polyisocyanate with at least one polyol, more preferably with at least one polyester polyol.

As polyisocyanates, such as, for example, as diisocyanates, use is made preferably of (hetero)aliphatic, (hetero) cycloaliphatic, (hetero)-aromatic, or (hetero) aliphatic-(hetero) aromatic diisocyanates. Preferred diisocyanates are those containing 2 to 36, more particularly 6 to 15 carbon atoms.

Preferred examples are ethylene 1,2-diisocyanate, tetramethylene 1,4-diisocyanate, hexamethylene 1,6-diisocyanate (HDI), 2,2,4-(2,4,4)-trimethylhexa-methylene 1,6-diisocyanate (TMDI), 1,3-bis(1-isocyanato-1-methylethyl) benzene, diphenylmethane diisocyanate (MDI), 1,9-diisocyanato-5-methylnonane, 1,8-diisocyanato-2,4-dimethyloctane, dodecane 1,12-diisocyanate, ω,ω'-diisocyanatodipropyl ether, cyclobutene 1,3-diisocyanate, cyclohexane 1,3- and 1,4-diisocyanate, 3-isocyanatomethyl-3,5,5-trimethylcyclohexyl isocyanate (isophorone diisocyanate, IPDI), 1,4-diisocyanatomethyl-2,3,5,6-tetramethylcyclohexane, decahydro-8-methyl(1,4-methanonaphthalen-2(or 3),5-ylene-dimethylene diisocyanate, hexahydro-4,7-methanoindan-1(or 2),5(or 6)-ylenedimethylene diisocyanate, hexahydro-4,7-methanoindan-1(or 2),5(or 6)-ylene diisocyanate, 2,4- and/or 2,6-hexahydrotolylene diisocyanate (H6-TDI), toluene 2,4- and/or 2,6-diisocyanate (TDI), perhydrodiphenylmethane 2,4'-diisocyanate, perhydrodiphenylmethane 4,4'-diisocyanate ($H_{12}$MDI), 4,4'-diisocyanato-3,3',5,5'-tetramethyldicyclo-hexylmethane, 4,4'-diisocyanato-2,2',3,3',5,5',6,6'-octamethyldicyclohexylmethane, ω,ω'-diisocyanato-1,4-diethylbenzene, 1,4-diisocyanatomethyl-2,3,5,6-tetra-methylbenzene, 2-methyl-1,5-diisocyanatopentane (MPDI), 2-ethyl-1,4-diisocyanatobutane, 1,10-diisocyanatodecane, 1,5-diisocyanatohexane, 1,3-diisocyanatomethylcyclo-hexane, 1,4-diisocyanatomethylcyclohexane, naphthylene diisocyanate, 2,5(2,6)-bis(isocyanatomethyl)bicyclo-[2.2.1]heptane (NBDI), and also any mixture of these compounds. Polyisocyanates of higher isocyanate functionality may also be used. Examples of such are trimerized hexamethylene diisocyanate and trimerized isophorone diisocyanate. Furthermore, mixtures of polyisocyanates may also be utilized. Especially preferred are toluene 2,4-diisocyanate and/or toluene 2,6-diisocyanate (TDI), or isomer mixtures of toluene 2,4-diisocyanate and toluene 2,6-diisocyanate and/or diphenylmethane diisocyanat (MDI) and/or hexamethylene 1,6-diisocyanate (HDI). Especially preferred is HDI as a polyisocyanate used for preparing the polyurethane resin.

As a polyol component of the polyurethane resin which has polymerizable carbon double bonds and is used for preparing the polymeric resin (P1), preference is given to using polyester polyols and/or polyether polyols.

Polyester polyols are particularly preferred. The polyurethane resin used in accordance with the invention is therefore preferably a polyester-polyurethane resin. Preference is therefore given to using a polyester polyol as prepolymer polyol component. Especially suitable polyester polyols are compounds which derive from at least one polyol such as at least one diol, as for example ethylene glycol, propylene glycol (1,2-propanediol), trimethylene glycol (1,3-propanediol), neopentyl glycol, 1,4-butanediol and/or 1,6-hexanediol, or such as at least one triol such as 1,1,1-trimethylolpropane (TMP), and from at least one dicarboxylic acid such as, for example, adipic acid, terephthalic acid, isophthalic acid, ortho-phthalic acid and/or dimethylolpropionic acid and/or at least one dicarboxylic acid derivative such as a dicarboxylic ester and/or a dicarboxylic anhydride such as phthalic anhydride. Especially preferred is a polyester polyol of this kind, used as prepolymer polyol component, which derives from at least one diol and/or triol selected from the group consisting of 1,6-hexanediol, neopentyl glycol, trimethylolpropane, and mixtures thereof, and from at least one dicarboxylic acid (or at least one dicarboxylic acid derivative thereof) selected from the group consisting of adipic acid, terephthalic acid, isophthalic acid, ortho-phthalic acid, dimethylolpropionic acid, and mixtures thereof. Preferably at least one such polyester polyol is used with at least one polyisocyanate, more particularly with HDI and/or IPDI, for preparing the polymeric resin (P1).

The polyurethane resin used for preparing the polymeric resin (P1) has polymerizable carbon double bonds as reactive functional groups, which permit a crosslinking reaction. These reactive functional groups are preferably selected from the group consisting of vinyl groups such as allyl groups and (meth)acrylate groups and also mixtures thereof.

Particularly preferred are vinyl groups such as allyl groups, more particularly allyl ether groups.

In order to introduce polymerizable carbon double bonds as reactive functional groups into the polymer when preparing the at least one polyurethane resin used for preparing the polymeric resin (P1), the polyurethane resin is prepared using not only the at least one polyisocyanate and the at least one polyol, such as the at least one polyester polyol, for example, but also at least one further polyol such as at least one diol as monomer, this monomer having at least one polymerizable carbon double bond as reactive functional group and preferably also having at least one group that is reactive toward isocyanate groups, such as at least one hydroxyl group, for example. Preference is given to using at least one diol as monomer that also has at least one polymerizable carbon double bond as reactive functional group, more preferably a reactive functional group selected from the group consisting of vinyl groups such as allyl groups, allyl ether groups, and (meth)acrylate groups and also mixtures thereof.

Particularly preferred are vinyl groups, more particularly allyl ether groups. One such monomer employed with preference is trimethylolpropane monoallyl ether. Alternatively and/or additionally it is also possible to use at least one polyol selected from the group consisting of glycerol monoallyl ether, pentaerythritol monoallyl ether, and pentaerythritol diallyl ether, and mixtures thereof.

The polymerizable carbon double bonds present in the polyurethane resin used for preparing the polymeric resin (P1) are therefore preferably introduced into the polyurethane resin via selection of a suitable polyol component, more particularly diol component, as monomer. At least one such polymerizable carbon double bond is therefore already present in these monomers.

With particular preference, the polyurethane resin used for preparing the polymeric resin (P1) has allyl ether groups as polymerizable carbon double bonds, which have been incorporated into the polyurethane resin preferably by selection of trimethylolpropane monoallyl ether as polyol component. Isocyanate groups still present in the resulting polyurethane segment may optionally be converted by reaction with at least one polyol such as trimethylolpropane, until isocyanate groups are no longer detectable. The polyurethane segment may be prepared optionally by addition of at least one catalyst such as dibutyltin dilaurate. The polyurethane segment is prepared preferably in an organic solvent such as methyl ethyl ketone (MEK) and/or methyl isobutyl ketone (MIBK), for example.

For preparing the polymeric resin (P1) used in accordance with the invention, the resulting polyurethane resin, having at least one polymerizable carbon double bond, is copolymerized in the presence of ethylenically unsaturated monomers. Further monomers may optionally be copolymerized as well but have no polymerizable carbon double bonds.

Monomers which can be used as ethylenically unsaturated monomers for preparing the polymeric resin (P1) are preferably selected from the group consisting of aliphatic and cycloaliphatic esters of acrylic acid or methacrylic acid ((meth)acrylates), ethylenically unsaturated monomers carrying at least one hydroxyl group in the molecule, preferably (meth)acrylates carrying at least one hydroxyl group in the molecule, ethylenically unsaturated monomers carrying at least one carboxyl group in the molecule, preferably (meth)acrylic acid, and mixtures thereof. With particular preference the ethylenically unsaturated monomers are selected from the group consisting of cyclohexyl acrylate, cyclohexyl methacrylate, alkyl acrylates, and alkyl methacrylates having up to 20 carbon atoms in the alkyl radical, such as, for example, methyl (meth)acrylate, ethyl (meth)acrylate, n-propyl (meth)acrylate, isopropyl (meth)acrylate, n-butyl (meth)acrylate, tert-butyl (meth)acrylate, n-hexyl (meth)acrylate, ethylhexyl (meth)acrylate, stearyl (meth)acrylate, and lauryl (meth)acrylate, or mixtures of these monomers, hydroxyalkyl esters of acrylic acid and/or methacrylic acid such as 2-hydroxyethyl (meth)acrylate, 2-hydroxypropyl (meth)acrylate, 3-hydroxypropyl (meth)acrylate, 3-hydroxybutyl (meth)acrylate, and 4-hydroxybutyl (meth)acrylate, (meth)acrylic acid, ethanediol di(meth)acrylate, 1,4-butanediol di(meth)acrylate, 1,6-hexanediol di(meth)acrylate, trimethylolpropane tri(meth)acrylate, pentaerythritol di(meth)acrylate, and allyl (meth)acrylate. Especially preferred ethylenically unsaturated monomers for preparing the polymeric resin (P1) are selected from the group consisting of n-butyl (meth)acrylate, methyl (meth)acrylate, 2-hydroxypropyl (meth)acrylate, 3-hydroxypropyl (meth)acrylate, (meth)acrylic acid, and mixtures thereof.

The expression "(meth)acrylic" or "(meth)acrylate" for the purposes of the present invention encompasses in each case the meanings "methacrylic" and/or "acrylic" and "methacrylate" and/or "acrylate", respectively.

The copolymerization may be initiated using at least one initiator such as tert-butyl peroxy-2-ethylhexanoate, for example. The copolymerization takes place preferably in an organic solvent such as methyl ethyl ketone (MEK) and/or methyl isobutyl ketone (MIBK), for example.

Polymeric resin P2 The polymeric resin (P2) is a polyester which has functional hydroxyl groups and an acid number of <25 mg of KOH per g of polyester. It is possible optionally to use a mixture of two different polymeric resins (P2).

Step (2) of the process for preparing the aqueous dispersion of the invention uses preferably a polymeric resin (P2) having a solids content of 100 wt % if a melt of the polymeric resin (P2) is employed.

The polymeric resin (P2) preferably has a weight-average molecular weight of 1000 to 100 000 g/mol, more preferably of 2000 to 80 000 g/mol, very preferably of 3000 to 60 000 g/mol, more particularly of 4000 to 55 000 g/mol or of 5000 to 50 000 g/mol. The method for determining the weight-average molecular weight is described hereinafter.

The polymeric resin (P2) preferably has a number-average molecular weight of 100 to 50 000 g/mol, more preferably of 200 to 40 000 g/mol, very preferably of 300 to 25 000 g/mol, more particularly of 500 to 20 000 g/mol or of 1000 to 10 000 g/mol. The method for determining the number-average molecular weight is described hereinafter.

The polymeric resin (P2) has an acid number of <25 mg of KOH per g of (P2), preferably of <20 mg of KOH per g of (P2), more preferably of <18 mg of KOH per g of (P2). The polymeric resin (P2) preferably has an acid number of 0 to <25, more preferably of 0 to <2, very preferably of 1 to <25, more particularly of 1 to <20 or of 1 to <18 mg of KOH per g of polymeric resin (P2).

The method for determining the acid number is described hereinafter.

The polymeric resin (P2) used in accordance with the invention preferably has functional OH groups. The polymeric resin (P2) preferably has an OH number (hydroxyl number) of 5 to 100, more preferably of 10 to 90, very preferably of 20 to 80, more particularly of 30 to 70 or of 40 to 60, mg of KOH per g of polymeric resin (P2). The method for determining the hydroxyl number is described hereinafter. In another preferred embodiment, the polymeric resin (P2) preferably has a hydroxyl number of <75 mg, more preferably of <60 mg, very preferably of <50 mg of KOH per g of (P2).

Polyesters of this kind that are suitable as polymeric resins (P2) derive preferably from at least one polyol such as, for example, at least one diol and/or triol and from at least one polycarboxylic acid such as, for example, at least one dicarboxylic acid and/or corresponding anhydrides. Suitable polyols are, for example, 1,6-hexanediol, neopentyl glycol, 2,2,4-trimethyl-1,3-pentanediol, trimethylolpropane, neopentyl glycol hydroxypivalate, and mixtures thereof.

Suitable polycarboxylic acids are, for example, adipic acid, terephthalic acid, isophthalic acid, ortho-phthalic acid, dimethylolpropionic acid, and hexahydrophthalic anhydride, and mixtures thereof.

The polymeric resin (P1) preferably has a weight-average molecular weight ($M_w$) in a range from 15 000 to 60 000 g/mol, and the polymeric resin (P2) preferably has a weight-average molecular weight ($M_w$) in a range from 5000 to 40 000 g/mol.

Aqueous Coating Composition

The present invention further provides an aqueous coating composition comprising
(A1) at least the aqueous dispersion (P) of the invention of at least two polymeric resins (P1) and (P2),
(A2) at least one crosslinking agent,
(A3) at least one pigment, and
(A4) optionally at least one additive
for at least partly coating at least one substrate metal surface, coated with at least one primer coat, with a topcoat, preferably in a coil coating process.

By virtue of the components (A1) and (A2) it comprises, the coating composition of the invention comprises at least one binder (A). This binder (A) comprises more particularly the at least one crosslinking agent (A2) and the at least two polymeric resins (P1) and (P2) present in the aqueous dispersion (P) used as component (A1). The term "binder" refers in the sense of the present invention, in accordance with DIN EN ISO 4618 (German version, date: March 2007) preferably to the nonvolatile fractions of a coating composition such as the coating composition of the invention that are preferably responsible for film formation. Pigments present therein, such as component (A3) and any fillers present, are therefore not subsumed by the term "binder". The nonvolatile fraction can be determined in accordance with DIN EN ISO 3251 (date: June 2008) by the method described hereinafter. The term "binder" refers more particularly to the polymeric resins (P1) and (P2) of component (A1) that are present in the coating composition and are responsible for film formation. The term "binder" further encompasses crosslinking agent present in the coating composition, i.e., component (A2).

All preferred embodiments described above herein in connection with the aqueous dispersion (P) of the invention are also preferred embodiments in terms of the use of this aqueous dispersion (P) including the components (P1) and (P2) present therein, as component (A1) of the aqueous coating composition of the invention.

Both the polymeric resin (P1) and the polymeric resin (P2) preferably have reactive functional groups which allow a crosslinking reaction. Any customary crosslinkable reactive functional group known to the skilled person is contemplated as a crosslinkable reactive functional group in this context. The polymeric resin (P2) has OH groups. The polymeric resin (P1) as well preferably has OH groups. The polymeric resins (P1) and (P2) may be self-crosslinking or externally crosslinking, preferably externally crosslinking.

In order to allow a crosslinking reaction, therefore, the coating composition of the invention comprises not only the polymeric resins (P1) and (P2) but also at least one crosslinking agent (A2).

The coating composition of the invention preferably contains no binders other than the binder (A).

The binder (A) present in the aqueous coating composition used in accordance with the invention is preferably crosslinkable thermally. The binder (A) is crosslinkable preferably on heating to a substrate temperature above room temperature, i.e., at a substrate temperature of 18-23° C. The binder (A) is preferably crosslinkable only at substrate temperatures ≥80° C., more preferably ≥110° C., very preferably ≥130° C., and especially preferably ≥140° C. With particular advantage the binder (A) is crosslinkable at a substrate temperature in the range from 100 to 275° C., more preferably at 125 to 275° C., very preferably at 150 to 275° C., especially preferably at 175 to 275° C., with more particular preference at 200 to 275° C., most preferably at 225 to 275° C.

The aqueous coating composition of the invention preferably has a solids content in the range from 30 to 80 wt %, more preferably from 35 to 77.5 wt %, very preferably from 40 to 75 wt %, especially preferably from 40 to 70 wt %, based in each case on the total weight of the coating composition.

The aqueous coating composition of the invention preferably has a solids content, in terms of the at least two polymeric resins (P1) and (P2), in a range from 15 to 45 wt %, more preferably from 20 to 40 wt %, very preferably from 20 to 35 wt %, more particularly from 25 to 35 wt %, based in each case on the total weight of the aqueous coating composition.

The coating composition of the invention comprises at least one crosslinking agent as component (A2).

The crosslinking agent (A2) is suitable preferably for thermal crosslinking and/or curing. Such crosslinking agents are known to the skilled person. To accelerate the crosslinking, suitable catalysts may be added to the aqueous coating composition.

All customary crosslinking agents (A2) known to the skilled person may be used for preparing the aqueous coating composition of the invention. Examples of suitable crosslinking agents are amino resins, resins or compounds containing anhydride groups, resins or compounds containing epoxide groups, tris(alkoxy-carbonylamino)triazines, resins or compounds containing carbonate groups, blocked and/or nonblocked polyisocyanates, β-hydroxyalkylamides, and also compounds having on average at least two groups capable of transesterification, examples being reaction products of malonic diesters with polyisocyanates or of esters and part-esters of polyhydric alcohols and malonic acid with monoisocyanates. Where blocked polyisocyanates are selected as crosslinking agents, the aqueous coating composition used in accordance with the invention is formulated as a 1-component (1-K) composition. Where nonblocked polyisocyanates are selected as crosslinking agents, the aqueous coating composition is formulated as a 2-component (2-K) composition.

One particularly preferred crosslinking agent (A2) is selected from the group consisting of blocked polyisocyanates and melamine resins such as melamine-formaldehyde condensation products, more particularly etherified (alkylated) melamine-formaldehyde condensation products.

Blocked polyisocyanates which can be utilized are any desired polyisocyanates such as, for example, diisocyanates in which the isocyanate groups have been reacted with a compound so that the blocked polyisocyanate formed is resistant in particular toward reactive functional groups such as hydroxyl groups, for example, at room temperature, i.e., at a temperature of 18 to 23° C., but reacts at elevated temperatures, as for example at 80° C., more preferably 110° C., very preferably 130° C., and especially preferably ≥140° C., or at 90° C. to 300° C. or at 100 to 250° C., more preferably at 125 to 250° C., and very preferably at 150 to 250° C.

In the preparation of the blocked polyisocyanates it is possible to use any organic polyisocyanates suitable for crosslinking. As polyisocyanates, such as, for example, as diisocyanates, use is made preferably of (hetero)aliphatic, (hetero)cycloaliphatic, (hetero)-aromatic, or (hetero)aliphatic-(hetero)aromatic diisocyanates. Preferred diisocyanates are those containing 2 to 36, more particularly 6 to 15 carbon atoms.

Preferred examples are ethylene 1,2-diisocyanate, tetramethylene 1,4-diisocyanate, hexamethylene 1,6-diisocyanate (HDI), 2,2,4-(2,4,4)-trimethylhexa-methylene 1,6-diisocyanate (TMDI), 1,3-bis(l-isocyanato-1-methylethyl)benzene, diphenylmethane diisocyanate (MDI), 1,9-diisocyanato-5-methylnonane, 1,8-diisocyanato-2,4-dimethyloctane, dodecane 1,12-diisocyanate, ω,ω'-diisocyanatodipropyl ether, cyclobutene 1,3-diisocyanate, cyclohexane 1,3- and 1,4-diisocyanate, 3-isocyanatomethyl-3,5,5-trimethylcyclohexyl isocyanate (isophorone diisocyanate, IPDI), 1,4-diisocyanatomethyl-2,3,5,6-tetramethylcyclohexane, decahydro-8-methyl(1,4-methanonaphthalen-2(or 3),5-ylene-dimethylene diisocyanate, hexahydro-4,7-methanoindan-1(or 2),5(or 6)-ylenedimethylene diisocyanate, hexahydro-4,7-methanoindan-1(or 2),5(or 6)-ylene diisocyanate, 2,4- and/or 2,6-hexahydrotolylene diisocyanate (H6-TDI), toluene 2,4- and/or 2,6-diisocyanate (TDI), perhydrodiphenylmethane 2,4'-diisocyanate, perhydrodiphenylmethane 4,4'-diisocyanate ($H_{12}$MDI), 4,4'-diisocyanato-3,3',5,5'-tetramethyldicyclo-hexylmethane, 4,4'-diisocyanato-2,2',3,3',5,5',6,6'-octamethyldicyclohexylmethane, ω,ω'-diisocyanato-1,4-diethylbenzene, 1,4-diisocyanatomethyl-2,3,5,6-tetra-methylbenzene, 2-methyl-1,5-diisocyanatopentane (MPDI), 2-ethyl-1,4-diisocyanatobutane, 1,10-diisocyanatodecane, 1,5-diisocyanatohexane, 1,3-diisocyanatomethylcyclo-hexane, 1,4-diisocyanatomethylcyclohexane, naphthylene diisocyanate, 2,5(2,6)-bis(isocyanatomethyl)bicyclo-[2.2.1]heptane (NBDI), and also any mixture of these compounds. Polyisocyanates of higher isocyanate functionality may also be used. Examples of such are trimerized hexamethylene diisocyanate and trimerized isophorone diisocyanate. Furthermore, mixtures of polyisocyanates may also be utilized. Especially preferred are toluene 2,4-diisocyanate and/or toluene 2,6-diisocyanate (TDI), or isomer mixtures of toluene 2,4-diisocyanate and toluene 2,6-diisocyanate and/or diphenylmethane diisocyanate (MDI) and/or hexamethylene 1,6-diisocyanate (HDI). Especially preferred is HDI as a polyisocyanate used for preparing the polyurethane resin.

Useful likewise as suitable crosslinking agents (A2) are melamine resins, preferably melamine-formaldehyde condensation products, more particularly optionally etherified (alkylated, such as $C_1$-$C_6$ alkylated for example) melamine-formaldehyde condensation products, which can be dispersed or dissolved in water. Their water-solubility or water-dispersibility is dependent—apart from on the degree of condensation, which is to be as low as possible—on the etherifying component, with only the lowest members of the alkanol or ethylene glycol monoether series producing water-soluble condensates. Particularly preferred are melamine resins etherified with at least one $C_{1-6}$ alcohol, preferably with at least one $C_{1-4}$ alcohol, more particularly with methanol (methylated), such as melamine-formaldehyde condensation products. Where solubilizers are used as optional further additives, it is also possible for ethanol-, propanol- and/or butanol-etherified melamine resins, more particularly the corresponding etherified melamine-formaldehyde condensation products, to be dissolved or dispersed in aqueous phase.

In one preferred embodiment the crosslinking agent (A2) of the coating composition of the invention is at least one melamine resin dispersible or soluble in water, preferably at least one melamine-formaldehyde condensation product dispersible or soluble in water, more particularly at least one etherified (alkylated), preferably methylated melamine-formaldehyde condensation product dispersible or soluble in water.

The aqueous coating composition of the invention preferably comprises as crosslinking agent (A2), therefore, at least one optionally alkylated melamine-formaldehyde condensation product. The aqueous coating composition of the invention preferably comprises the crosslinking agent (A2) in an amount of 5 to 35 wt %, preferably in an amount of 10 to 30 wt %, more preferably in an amount of 15 to 25 wt %, based on the total weight of the polymeric resins (P1) and (P2), based on the respective solids content.

The aqueous coating composition preferably comprises the crosslinking agent (A2) in an amount of 1 to 20 wt %, preferably in an amount of 2 to 15 wt %, more preferably in an amount of 3 to 10 wt %, based on the total weight of the aqueous coating composition.

The coating composition of the invention comprises at least one pigment as component (A3).

A pigment of this kind is preferably selected from the group consisting of organic and inorganic, coloring and extender pigments. Examples of suitable inorganic coloring pigments are white pigments such as zinc white, zinc sulfide, or lithopone; black pigments such as carbon black, iron manganese black, or spinel black; chromatic pigments such as chromium oxide, chromium oxide hydrate green, cobalt green, or ultramarine green, cobalt blue, ultramarine blue, or manganese blue, ultramarine violet or cobalt violet and manganese violet, red iron oxide, cadmium sulfoselenide, molybdate red or ultramarine red; brown iron oxide, mixed brown, spinel phases and corundum phases, or chromium orange; or yellow iron oxide, nickel titanium yellow, chromium titanium yellow, cadmium sulfide, cadmium zinc sulfide, chromium yellow, or bismuth vanadate. Examples of suitable organic coloring pigments are monoazo pigments, disazo pigments, anthraquinone pigments, benzimidazole pigments, quinacridone pigments, quinophthalone pigments, diketopyrrolopyrrole pigments, dioxazine pigments, indanthrone pigments, isoindoline pigments, isoindolinone pigments, azomethine pigments, thioindigo pigments, metal complex pigments, perinone pigments, perylene pigments, phthalocyanine pigments, or aniline black. Examples of suitable extender pigments or fillers are chalk, calcium sulfate, barium sulfate, silicates such as talc or kaolin, silicas, oxides such as aluminum hydroxide or magnesium hydroxide, or organic fillers such as textile fibers, cellulose fibers, polyethylene fibers, or polymer powders; for further details, refer to Römpp Lexikon Lacke und Druckfarben, Georg Thieme Verlag, 1998, pages 250 ff., "Fillers".

Particularly preferred are titanium dioxide and/or white pigments such as zinc white, zinc sulfide and/or lithopone as at least one pigment (A3).

Effect pigments, furthermore, may be used as pigments (A3) present in the aqueous coating composition. A skilled person is familiar with the concept of effect pigments. Effect pigments more particularly are those pigments which impart optical effect or color and optical effect, more particularly optical effect. A corresponding division of the pigments may be made in accordance with DIN 55944 (date: December 2011). The effect pigments are preferably selected from the group consisting of organic and inorganic optical effect and color and optical effect pigments. They are more preferably selected from the group consisting of organic and inorganic optical effect or color and optical effect pigments. The organic and inorganic optical effect and color and optical effect pigments are more particularly selected from the group consisting of optionally coated metallic effect pigments, of optionally coated metal oxide effect pigments, of effect pigments composed of optionally coated metals and nonmetals, and of optionally coated nonmetallic effect pigments. The optionally coated metallic effect pigments, such as silicate-coated metallic effect pigments, for example, are more particularly aluminum effect pigments, iron effect pigments, or copper effect pigments. Especially preferred are optionally coated—such as silicate-coated, for example—aluminum effect pigments, more particularly commercially available products from Eckart such as Stapa® Hydrolac, Stapa® Hydroxal, Stapa® Hydrolux, and Stapa® Hydrolan, most preferably Stapa® Hydrolux and Stapa® Hydrolan. The effect pigments used in accordance with the invention, more particularly optionally coated—such as silicate-coated, for example—aluminum effect pigments, may be present in any customary form known to the skilled person, such as a leaflet form and/or a platelet form, for example, more particularly a (corn)flake form or a silver dollar form. The effect pigments composed of metals and nonmetals are, more particularly, platelet-shaped aluminum pigments coated with iron oxide, of the kind described in, for example, European patent application EP 0 562 329 A2; glass leaflets coated with metals, more particularly aluminum; or interference pigments which comprise a reflector layer made of metal, more particularly aluminum, and which exhibit a strong color flop. The nonmetallic effect pigments are more particularly pearlescent pigments, especially mica pigments; platelet-shaped graphite pigments coated with metal oxides; interference pigments which comprise no metal reflector layer and have a strong color flop; platelet-shaped effect pigments based on iron oxide, having a shade from pink to brownish red; or organic liquid-crystalline effect pigments. For further details of the effect pigments that are used in accordance with the invention, reference is made to Römpp Lexikon Lacke und Druckfarben, Georg Thieme Verlag, 1998, page 176, "Effect pigments", and pages 380 and 381, "Metal oxide-mica pigments" to "Metal pigments".

The amount of pigment (A3) in the aqueous coating composition of the invention may vary. The pigment content, based on the aqueous coating compositions provided in accordance with the invention, is preferably in the range from 0.1 to 50 wt %, more preferably the range from 1.0 to 45 wt %, very preferably in the range from 2.0 to 40 wt %, especially preferably in the range from 3.0 to 35 wt %, and more particularly in the range from 4.0 to 35 wt %.

Alternatively the aqueous coating composition of the invention comprises the at least one pigment (A3) preferably in an amount in a range from 10 to 60 wt %, more preferably from 15 to 55 wt %, very preferably from 20 to 50 wt %, more particularly from 25 to 45 wt %, based in each case on the total weight of the aqueous coating composition.

Depending on the desired application, the coating composition of the invention and also the dispersion (P) of the invention may comprise one or more typically employed additives as component (A4). These additives (A4) are preferably selected from the group consisting of antioxidants, antistats, wetting and dispersing agents, emulsifiers, flow control assistants, solubilizers, defoaming agents, wetting agents, stabilizers, preferably heat stabilizers and/or thermal stabilizers, process stabilizers, and UV and/or light stabilizers, photoprotectants, deaerators, inhibitors, catalysts, waxes, wetters and dispersants, flexibilizers, flame retardants, solvents, reactive diluents, vehicles, resins, hydrophobizing agents, hydrophilizing agents, carbon black, metal oxides and/or semimetal oxides, thickeners, thixotroping agents, impact tougheners, expandants, process aids, plasticizers, solids in powder and fiber forms, preferably solids in powder and fiber forms selected from the group consisting of fillers, glass fibers, and reinforcing agents, and mixtures of the abovementioned further additives. The amount of additive (A4) in the coating composition of the invention may vary. The amount, based on the total weight of the coating composition of the invention, is preferably 0.01 to 20.0 wt %, more preferably 0.05 to 18.0 wt %, very preferably 0.1 to 16.0 wt %, especially preferably 0.1 to 14.0 wt %, more particularly 0.1 to 12.0 wt %, and most preferably 0.1 to 10.0 wt %. The amount, based on the total weight of the dispersion (P) of the invention, is preferably 0.01 to 20.0 wt %, more preferably 0.05 to 18.0 wt %, very preferably 0.1 to 16.0 wt %, especially preferably 0.1 to 14.0 wt %, more particularly 0.1 to 12.0 wt %, and most preferably 0.1 to 10.0 wt %.

Process for Preparing the Aqueous Coating Composition

The present invention further relates to a process for preparing the coating composition of the invention.

The coating composition of the invention may be prepared by first preparing an aqueous dispersion (P) which is obtainable by a process comprising at least steps (1), (2), (3), and (4):

(1) preparing a dispersion or solution of the at least one polymeric resin (P1) in at least one organic solvent,
(2) preparing a mixture of the dispersion or solution obtained by step (1) and of a melt or solution of the at least one polymeric resin (P2),
(3) adding water to the mixture obtained by step (2), and
(4) removing the organic solvent from the mixture obtained by step (3) to give the aqueous dispersion (P).

Optionally it is possible for a step (2a) to be carried out between step (2) and step (3), as described above.

Following this, the resulting dispersion (P) as component (A1) is mixed with the further components used in accordance with the invention for preparing the coating composition of the invention, i.e., components (A2) and (A3) and also, optionally, (A4) and, optionally, water, in a step (5), using, for example, high-speed stirrers, stirring tanks, agitator mills, dissolvers, kneading devices, or inline dissolvers.

Use of the Aqueous Coating Composition

Additionally provided by the present invention is the use of the aqueous coating composition of the invention for at least partly coating at least one substrate metal surface, coated with at least one primer coat, with a topcoat, preferably in a coil coating process.

All preferred embodiments described hereinabove in connection with the aqueous coating composition of the invention are also preferred embodiments in relation to the use of this aqueous coating composition of the invention for at least partly coating at least one substrate metal surface, coated with at least one primer coat, with a topcoat, preferably in a coil coating process.

The substrate used may be any article having at least one metallic surface, more particularly a metal strip.

Process, More Particularly Coil Coating Process

The present invention further provides a process for at least partly coating at least one substrate metal surface, coated with at least one primer coat, with a topcoat, preferably comprising at least one step (d)

(d) at least partly coating at least one substrate metal surface, coated with at least one primer coat, with the aqueous coating composition of the invention, to apply a topcoat.

Preferably step (d) is part of a coil coating process.

Additionally provided by the present invention is a process, preferably a coil coating process, for at least partly coating at least one substrate metal surface, comprising the steps of (a) optionally cleaning the metal surface to remove soiling,
(b) optionally at least single-sidedly applying a pretreatment coat to the metal surface,
(c) at least single-sidedly applying a primer coat to the metal surface or to the pretreatment coat optionally applied in step (b), and optionally curing the primer coat thus applied,
(d) at least partly coating the metal surface, coated with the primer coat as per step (c), with the aqueous coating composition of the invention for the application of a topcoat,
(e) curing the topcoat applied as per step (d).

All preferred embodiments described hereinabove in connection with the aqueous coating composition of the invention are also preferred embodiments in relation to the use of this aqueous coating composition of the invention for at least partly coating at least one substrate metal surface, coated with at least one primer coat, with a topcoat, preferably in a coil coating process or for at least partly coating at least one substrate metal surface, more particularly within step (d) of each of these processes.

Step (d) of the process of the invention takes place between steps (c) and (e).

The optional steps (a) and/or (b) and step (c) are carried out before step (d). Step (e) is carried out after step (d).

The cleaning in the optional step (a) of the process of the invention preferably comprises degreasing of the metal surface of the substrate such as of the metal strip, for example. In the course of this cleaning it is possible to remove soiling which has become attached in the course of storage, or to remove temporary anticorrosion oils by means of cleaning baths.

The pretreatment coat in the optional step (b) of the process of the invention is applied preferably with a dry film thickness in a range from 1 to 10 μm, more preferably in a range from 1 to 5 μm. Alternatively the pretreatment coat may also have a dry film thickness <1 μm, as for example in the range from <1 μm to 5 μm. Application of the pretreatment coat takes place preferably in a dipping or spraying process or by roll application. This coat is intended to increase the corrosion resistance and may also serve to improve the adhesion of subsequent coats to the metal surface.

Known pretreatment baths include, for example, those containing Cr(VI), those containing Cr(III), and also chromate-free baths, such as, for example, those containing phosphate.

Step (b) may alternatively also take place with an aqueous pretreatment composition which comprises at least one water-soluble compound containing at least one Ti atom and/or at least one Zr atom, and comprising at least one water-soluble compound as a source of fluoride ions, containing at least one fluorine atom, or with an aqueous pretreatment composition which comprises a water-soluble compound obtainable by reaction of at least one water-soluble compound containing at least one Ti atom and/or at least one Zr atom with at least one water-soluble compound as a source of fluoride ions, containing at least one fluorine atom. The at least one Ti atom and/or the at least one Zr atom here preferably have/has the +4 oxidation state. By virtue of the components present in the aqueous pretreatment composition, and preferably also by virtue of the appropriately selected proportions thereof, the composition preferably comprises a fluoro complex such as, for example, a hexafluorometallate, i.e., more particularly hexa-fluorotitanate and/or at least one hexafluorozirconate. The overall concentration of the elements Ti and/or Zr in the pretreatment composition preferably is not below $2.5 \cdot 10^{-4}$ mol/L but is not greater than $2.0 \cdot 10^{-2}$ mol/L.

The preparation of such pretreatment compositions and their use in pretreatment is known from WO 2009/115504 A1, for example. The pretreatment composition preferably further comprises copper ions, preferably copper(II) ions, and also, optionally, one or more water-soluble and/or water-dispersible compounds comprising at least one metal ion selected from the group consisting of Ca, Mg, Al, B, Zn, Mn and W, and also mixtures thereof, preferably at least one aluminosilicate and in that case more particularly one which has an atomic ratio of Al to Si atoms of at least 1:3. The preparation of such pretreatment compositions and their use in pretreatment is likewise known from WO 2009/115504 A1. The aluminosilicates are present preferably in the form of nanoparticles, having an average particle size which is determinable by dynamic light scattering in the range from 1 to 100 nm. The average particle size of such nanoparticles which is determinable by dynamic light scattering, in the range from 1 to 100 nm, is determined here in accordance with DIN ISO 13321 (date: Oct. 1, 2004). The metal surface after step (b) preferably has a pretreatment coat. Alternatively step (b) may also take place with an aqueous sol-gel composition.

The primer coat, i.e., a layer of primer, is applied preferably in step (c) of the process of the invention with a dry film thickness in a range from 5 to 45 μm, more preferably in a range from 2 to 35 μm, more particularly in a range from 2 to 25 μm. This coat is typically applied in a roll application process. Primer coats of this kind are known from WO 2006/079628 A1, for example.

The topcoat in step (d) of the process of the invention is applied preferably with a dry film thickness of up to 30 μm, more particularly up to 25 μm, such as a dry film thickness in the range from 10 to 27 μm or 10 to 25 μm, for example, at least partly to a substrate metal surface coated with the primer coat as per step (c), using the aqueous coating composition of the invention. The coating composition of the invention as topcoat is applied preferably with a dry film thickness in the range from 10 to 25 μm or from 10 to <28 μm or from 10 to <27 μm, more particularly from 10 to 25 μm.

With particular preference the coating composition of the invention is applied as topcoat with a dry film thickness in the range from 10 to 25 μm or from 10 to 20 μm, very preferably in the range from 12 to 25 μm, more particularly in the range from 15 to 25 μm. The dry film thickness is determined by the method described below. This coat is typically applied in a roll application process.

The curing in step (e) takes place preferably at temperatures above room temperature, i.e., above 18-23° C., more preferably at temperatures ≥80° C., even more preferably 110° C., very preferably 140° C., and especially preferably 170° C. Particularly advantageous is curing at 100 to 250° C., more preferably at 150 to 250° C., and very preferably at 200 to 250° C. Curing takes place preferably over a time of 30 s to 60 s.

The process of the invention is preferably a continuous process.

The process of the invention is preferably a coil coating process, which is known to the skilled person, from WO 2006/079628 A1, for example.

The substrate used can be any article which has at least one metallic surface, more particularly a metal strip.

The term "metal strip" in the sense of the present invention refers preferably not only to strips consisting entirely of at least one metal but also to strips which are only coated with at least one metal, i.e., have at least one metallic surface, and themselves consist of different kinds of material, such as of polymers or composite materials. "Strips" in the sense of the present invention are preferably sheetlike elements having at least one metallic surface, more preferably selected from the group consisting of sheets, foils, and plates. The term "metal" preferably also encompasses alloys. In one preferred embodiment a "metal strip" in the sense of the present invention consists entirely of metals and/or alloys. The metals or alloys in question are preferably nonnoble metals or alloys which are typically employed as metallic materials of construction and which require protection against corrosion.

All customary metal strips known to the skilled person may be coated by means of the process of the invention.

The metals used for producing the metal strips of the invention are preferably selected from the group consisting of iron, steel, zinc, zinc alloys, aluminum, and aluminum alloys. The metal may optionally have been galvanized, such as galvanized iron or galvanized steel, for example, such as electrolytically galvanized or hot-dip-galvanized steel. Zinc alloys or aluminum alloys and also their use for the coating of steel are known to the skilled person. The skilled person selects the nature and amount of alloying constituents in accordance with the desired end use. Typical constituents of zinc alloys include more particularly Al, Pb, Si, Mg, Sn, Cu, or Cd. Typical constituents of aluminum alloys include more particularly Mg, Mn, Si, Zn, Cr, Zr, Cu, or Ti. The term "zinc alloy" is also intended to include Al/Zn alloys in which Al and Zn are present in approximately equal amounts, and also Zn/Mg alloys in which Mg is present in an amount of 0.1 to 10 wt %, based on the total weight of the alloy. Steel coated with alloys of these kinds is available commercially. The steel itself may include the customary alloying components known to the skilled person.

In the coil coating process of the invention, metal strips with a thickness of preferably 0.2 to 2 mm and a width of up to 2 m are transported at a speed of up to 200 m/min through a coil coating line, in the course of which they are coated.

Typical apparatus in which the process of the invention can be implemented comprises a feed station, a strip store, a cleaning and pretreatment zone, in which the optional cleaning may take place and optional pretreatment coat may be applied, a first coating station for applying the primer coat, along with drying oven and downstream cooling zone, a second coating station for applying the topcoat, with drying oven, laminating station, and cooling, and a strip store and a winder (2-coat line). In the case of a 1-coat line, in contrast, optional cleaning and also the application of a pretreatment primer coat take place in a combined cleaning, pretreatment, and coating zone together with drying oven and downstream cooling zone. This is followed by a coating station for applying a topcoat, with drying oven, laminating station, and cooling, and by a strip store and a winder.

Topcoat Additionally provided by the present invention is a topcoat which is obtainable by at least partial coating of at least one substrate metal surface, coated with at least one primer coat, with the aqueous coating composition of the invention, and/or which is obtainable by the process of the invention, more particularly after implementation of step (d) and optionally after curing as per step (e).

This topcoat is applied to at least one substrate metal surface coated with at least one primer coat. This process is preferably a coil coating process, i.e. a process for the coating of strips.

At Least Partly Coated Substrate

The present invention relates, furthermore, to an at least partly coated substrate obtainable by the process of the invention, such as, for example, a corresponding at least partly coated metal strip.

Further provided by the present invention is a component, preferably a metallic component, produced from at least one such coated substrate such as a coated metal strip. Components of this kind may be, for example, bodywork and parts thereof for motor vehicles such as automobiles, trucks, motorcycles, and buses, and components of electrical household products or else components from the sector of instrument casings, façade claddings, ceiling sheeting, or window profiles.

Methods of Determination

1. Determination of the Hydroxyl Number

The method for determining the hydroxyl number is based on DIN 53240-2 (date: November 2007). Determination of the hydroxyl number is used to ascertain the amount of hydroxyl groups in a compound. A sample of a compound whose hydroxyl number is to be ascertained is reacted here with acetic anhydride in the presence of 4-dimethylaminopyridine (DMAP) as catalyst, and the hydroxyl groups of the compound are acetylated. For each hydroxyl group there is one molecule of acetic acid formed. The subsequent hydrolysis of the excess acetic anhydride yields two molecules of acetic acid. The consumption of acetic acid is determined by titrimetry from the difference between the main value found and a blank value, which is to be run in parallel.

A sample is weighed out to an accuracy of 0.1 mg, using an analytical balance, into a 150 mL glass beaker, and the sample vessel is subsequently given a magnetic stirring bar and placed into the sample changer of an automatic titrator featuring sample changer and dosing stations for the individual reagents and solvents (Metrohm Titrando 835 with integrated Karl-Fischer titration stand, from Metrohm). After the sample has been weighed out, the processing sequence is started on the automatic titrator. The following operations are run fully automatically, in the order given below:

Addition of 25 mL of THF and 25 mL of catalyst reagent to all sample vessels

Stirring of the samples for 5-15 minutes, depending on solubility

Addition of 10 mL of acetylation reagent to all sample vessels 13 minutes' waiting, stirring for 15 seconds, further 13 minutes' waiting Addition of 20 mL of hydrolysis reagent (N,N-dimethylformamide (DMF) and deionized water (DI water) in a ratio of 4:1% by volume) to all sample vessels 7 minutes' waiting, 15 seconds' stirring (3 times in total)

Titration with 0.5 mol/L methanolic KOH Endpoint recognition takes place potentiometrically.

The electrode system used here is an electrode system consisting of a platinum titrode and reference electrode (silver/silver chloride with lithium chloride in ethanol).

The acetylating reagent is prepared by charging 500 mL of DMF to a 1000 mL measuring flask, adding 117 mL of acetic anhydride, and making up to the 1000 mL mark with DMF.

The catalyst reagent is prepared by dissolving 25 g of 4-dimethylaminopyridine (DMAP) in 2.5 L of DMF.

The hydroxyl number (OH number) in mg of KOH/g is calculated according to the following formula:

$$\text{OH number} = \frac{(V_2 - V_1) \cdot c \cdot 56.1}{m} + AN$$

$V_1$=consumption of KOH in the main test in mL (main value)
$V_2$=consumption of KOH in the blank test in mL (blank value)
c=concentration of potassium hydroxide solution, in mol/L
m=initial mass in g
AN=acid number in mg of KOH/g of sample 2. Determination of Number-Average and Weight-Average Molecular Weights The number-average molecular weight ($M_n$) is determined by gel permeation chromatography (GPC). This method of determination is based on DIN 55672-1 (date: August 2007). This method can be used to determine not only the number-average molecular weight but also the weight-average molecular weight ($M_w$) and the polydispersity (ratio of weight-average molecular weight ($M_w$) to number-average molecular weight ($M_n$)).

5 mg of a sample (based on the solids fraction) are dissolved using an analytical balance in 1.5 mL of mobile phase. The mobile phase used is tetrahydrofuran containing 1 mol/L of acetic acid. The sample solution is further admixed with 2 μl of ethylbenzene/mL of solution. All insoluble fractions that may be present, such as pigments, for example, are removed by centrifuging or filtration.

The number-average molecular weight ($M_n$) is determined against polymethyl methacrylate standards of different molecular weights (PMMA standards). Before the beginning of each determination here, a calibration is run. This is done by injecting the PMMA standards (each with a concentration of 0.1 mg/mL in mobile phase (which additionally contains 2 μl of ethylbenzene/mL)).

The calibration plot (5th-order polynomial) is constructed from the PMMA standards with different molecular weights, by determining the respective retention time of the individual PMMA standards for the analysis series.

The instrument used is a self-contained system comprising GPC column, Agilent 1100 pump, autosampler and RI detector. The column used is the column set PSS 10e3/10e5/10e6 (300 mm×8 mm; particle size 5 μm).

The following settings are used here:
Injection volume: 100 μl
Temperature: 35° C.
Flow rate: 1.0 ml/min
Run time: 40 min Evaluation takes place using PSS analytical software. The concentration of the molecules eluted from the separating columns according to descending coil size is measured using a concentration-sensitive detector, more particularly a differential refractometer. The resulting sample chromatogram is then used, together with the calibration plot determined beforehand for the system, to calculate the relative molar mass distribution, the number-average molecular weight ($M_n$), the weight-average molecular weight ($M_w$), and the polydispersity factor $M_w/M_n$. The limits of analysis are specified individually for each sample. The calculated values for $M_n$ and $M_w$ represent "equivalent PMMA molecular weights". The absolute molecular weights of the polymers may deviate from these values.

3. MEK Test Based on DIN EN 13523-11 (Date: September 2011)

The MEK test serves to determine the resistance of coating films to organic solvents (rub test).

A piece of cotton compress (Art. No. 1225221 from Rimer Apotheke Rheinberg) is affixed with a rubber band to the head of an MEK hammer and then soaked with MEK (methyl ethyl ketone) as solvent. The hammer weighs 1200 g and has a handle with a placement area of 2.5 cm². The hammer is likewise filled with solvent, which runs continuously into the cotton compress. This guarantees that the compress is dripping wet throughout the test. A metal test sheet is rubbed once back and forth (=1 DR, one double rub) with the compress, this sheet being like one of the metal test sheets TB1 and TV1, used in the examples. The test distance here is 9.5 cm. 1 DR here is to be performed in 1 s. During this procedure, no additional force is exerted on the hammer. The top and bottom points of reversal at the edges of the metal test sheet are not evaluated. A count is made of the DRs needed in order to erode the entire coating film on the metal test sheet down to the substrate, and this value is reported. If such erosion is not achieved by the time a maximum of 300 DRs have been reached, the test is terminated after a maximum of 300 DRs.

4. Determination of Corrosion Resistance

The corrosion resistance of coatings is ascertained by determining the edge corrosion and scratch corrosion in a neutral salt spray test (based on DIN EN 13523-8 (date: July 2010)).

The reverse side and the top and bottom edges of a metal test sheet coated with a coating film, such as, for example, one of the metal test sheets TB1 or TV1 used in the examples, is taped off with TESA-film (No. 4204) tape and thus protected from corrosion. The long edges of the metal test sheet are cut freshly once from top to bottom (right-hand edge) and once from bottom to top (left-hand edge). In deviation from DIN EN 13523-8, the sheet is not deformed. Centrally on the sheet, the coating film is damaged over a length of approximately 11 cm using a scratch needle (van Laar), this damage mark necessarily being at least 2 cm from the edges. After this, a neutral salt spray test is carried out, using an SL 2000 corrosion tester from Liebisch. The attacking medium in this case is an aqueous NaCl solution with a concentration by mass of 50-60 g/L, which is sprayed continuously onto the sheet. The testing temperature is 35° C. (+2° C.). After 360 hours or after 1008 hours, during which the sheet under investigation remains in each case in the test chamber, the respective sheet is rinsed off with water and, after storage for 2-5 hours, is scratched with a blade. The extent of the sub-film creep/corrosion that has taken place is now ascertained by measurement. For this purpose, a stencil produced in-house is placed onto the edges and measurement takes place at each of 10 marked sites. The stencil is then shifted by 0.5 cm and a further 10 points are measured. The average is subsequently formed. The same method is then used to measure the scratch, and here it is necessary to ensure that the stencil is applied in such a way that the 0-line (the line on the stencil which marks the value of zero mm) lies on the scratch, followed by measurement of the 10 sites to the right and left of the scratch respectively. Here again, the measurement is repeated after shifting by 0.5 cm. To obtain the average, the sum total of the values obtained by measurement is divided by 40. The area subjected to measurement serves as a comparison yardstick for the sub-film corrosion creep.

5. Determination of the Bendability/Cracking (T-Bend) and the Adhesion (Tape) of Coatings According to DIN EN 13523-7 (Date: October 2012)

The test method is used to ascertain the bendability or cracking (T-bend) and the adhesion (tape) of substrates coated with coating materials, under a flexural load, at 20° C.

The coated metal test sheets under investigation—such as, for example, the metal test sheets TB1 or TV1 used in the examples—are cut into strips 3-5 cm wide and prebent by 135°, with the coated side facing outward, so that the bending shoulder lies in the rolling direction (i.e., counter to the film-drawing direction). After edge bending to 1350, a specified number of metal test sheets is inserted, each having the same sheet thickness prior to the compression of the test panels with the vise. The extent of the deformation is indicated by the T value. The notation here is as follows:
0 T: no metal sheet as interlayer
0.5 T: 1 metal sheet as interlayer
1.0 T: 2 sheets as interlayer
1.5 T: 3 sheets as interlayer
2.0 T: 4 sheets as interlayer
2.5 T: 5 sheets as interlayer
3.0 T: 6 sheets as interlayer The radius of bending is altered until the smallest bend has been found at which cracks are no longer visible in the coating on the bending shoulder under a magnifier at 10-times magnification. The resulting value is then recorded as the T-bend.

A strip of TESA-film (No. 4104) tape is then rubbed firmly on, using the finger or a thin rod, over this bending shoulder, and is peeled off suddenly. This strip is adhered to a sheet of paper (black in the case of pale-colored coating systems or white in the case of dark coating systems) and investigated with the magnifier, under a 100 W lamp, for residues of coating material. The bending radius is altered until the smallest bend has been found at which there are no longer any residues of coating material visible on the TESA tape imprint under the magnifier at 10-times magnification. This value is then recorded as tape.

6. Determination of Dry Film Thickness According to DIN EN ISO 2808 (Method 6B) (Date: May 2007)

The coated surface of a substrate coated with at least this coating material, such as one of the metal test sheets TB1 or TV1, for example, is first marked with a dark or black Edding marker, and then at this marked site it is inscribed at an oblique angle down to the substrate in a V-shape using a cutter (defined by the scratch needle). Using the scale (microscope) built into the PIG film-thickness measuring instrument from Byk Gardner, with a 3419 cutter (1 part-line=1 µm), the film thickness of the individual coating can be read off. For a film thickness >2 m, the read-off error is ±10%.

7. Determination of Popping

The test method is used to determine popping and to assess flow defects on substrates coated with at least one coating material, such as, for example, one of the metal test sheets TB1 or TV1. It determines the dry film thickness above which popping is evident on the film surface. The dry film thickness is determined according to the method described above in Section 9. A substrate such as an OE HDG 5 galvanized steel panel is coated with a coating composition under test, and is baked under the desired baking conditions. Following determination of the dry film thickness in accordance with the method described in Section 6., the coated substrates under investigation, such as, for example, one of the metal test sheets TB1 or TV1, are inspected to ascertain the film thickness above which the respective coating surface exhibits popping marks. This dry film thickness is reported as the popping limit.

8. Determination of the Acid Number

The acid number is determined in accordance with DIN EN ISO 2114 (date: June 2002), using "Method A". The acid number reported corresponds to the total acid number specified in the DIN standard.

9. Determination of the Nonvolatile Fraction

The nonvolatile fraction, i.e., the solids content (solids fraction), of the aqueous dispersion (P) or of the coating composition, for example, is determined in accordance with DIN EN ISO 3251 (date: June 2008). The test duration is 60 minutes at a temperature of 130° C.

10. Gloss Measurement at 60° Angle According to DIN EN 13523-2 (Date: October 2012)

The gloss measurement at 600 is used to determine the surface gloss of coated areas. Determination takes place using a MICRO TRI-GLOSS gloss meter from BYK. Prior to each measurement, the instrument is calibrated with the installed calibration standards. For the test, the angle setting of 60° is selected on the instrument. 5 measurements are conducted in the longitudinal direction (film-drawing direction or direction of application), by placing the instrument onto the surface in a planar fashion, and reading off the measurement value. From 5 measurement values, an average is calculated and is noted in the test records. Assessment is made by determination of the gloss value (GU) between 0 and 100.

11. UVCON Test Procedure According to DIN EN ISO 4892-3 (Date: March 2011)

The test process is an accelerated weathering method for the testing of the light and weather fastness of coating materials, in which 8 fluorescent lamps (UVA 340) simulate the insolation of outdoor weathering. A light/dark cycle and a dry/wet phase simulate the weather conditions.

The specimens are exposed to cycles each of 4 hours of dry UV irradiation at a black panel temperature of $(60\pm3)°$ C., followed by 4 hours of water condensation, without irradiation, at a black panel temperature of $(40\pm3)°$ C. (one cycle encompasses 8 hours of exposure).

For all of the panels under test, a determination is made of the 60° gloss, as described in Section 10., before the start and after specified cycles. By this means it is possible to determine the percentage drop in gloss after specified cycles. The UVCON test may be conducted over a total duration of 1008 hours, for example. As an objective there are UV classes in which the maximum permitted drop in gloss and difference in shade after a fixed time is defined. In deviation from the DIN, the shade is not determined again after the exposure.

The inventive and comparative examples below serve to elucidate the invention, but should not be interpreted as restricting it.

1. Preparation of an Inventive Aqueous Dispersion Comprising the Polymeric Resins (P1) and (P2)

1.1 Preparing a Solventborne Dispersion of a Polymeric Resin (P1)

In a 5 L reaction vessel with stirrer, reflux condenser and 2 feed vessels, a mixture of 353.5 g of a polyester having a number-average molecular weight ($M_n$) of 630 g/mol, based on adipic acid, maleic anhydride, 1,6-hexanediol and ethylbutylpropane-1,3-diol (molar ratio 0.9:0.1:0.5:1), 39.4 g of neopentyl glycol, 18.0 g of trimethylolpropane monoallyl ether, 0.45 g of dibutyltin dilaurate and 330 g of methyl isobutyl ketone (MIBK) is admixed with 289.5 g of isophorone diisocyanate. The reaction mixture is subsequently heated under a nitrogen atmosphere to a temperature of 105° C. At an NCO content of 2.2 wt %, 69.6 g of trimethylolpropane (TMP) are added to the reaction mixture. At a residual NCO content of <0.05 wt %, 150.2 g of methyl isobutyl ketone (MIBK) are added. Subsequently, at a temperature of 105° C., a mixture of 417.4 g of n-butyl acrylate, 217.4 g of methyl methacrylate, 75.9 g of 3-hydroxypropyl methacrylate and 1059.4 g of acrylic acid is added to the reaction mixture over the course of 3 hours. At the same time, 179.9 g of an 11.7 percent strength solution of tertiary-butyl perethylhexanoate in methyl isobutyl ketone are metered in over the course of 3.5 hours. This gives a solventborne dispersion of a polyurethane-(meth)acrylic copolymer as polymeric resin (P1), having a solids content of 69 wt %, based on the total weight of the dispersion. The polymeric resin (P1) has an acid number of 31±1 mg of KOH per g of (P1).

1.2 Preparing a Polymeric Resin (P2)

A polyester is used as polymeric resin (P2). This polyester is prepared by combining the components identified below with stirring using a dissolver in the order stated: neopentyl glycol hydroxypivalate (HPN) (9.86 g), neopentyl glycol (14.80 g), trimethylol-propane (5.12 g), 2,2,4-trimethyl-1,3-pentanediol (TMPD) (17.17 g), adipic acid (13.92 g), isoterephthalic acid (28.48 g) and hexahydrophthalic anhydride (10.66 g). The components used are introduced into a reactor, the resulting mixture is heated to 230-250° C., and is melted with stirring in the process. Where appropriate, water of reaction formed is removed by distillation. This gives a polyester as polymeric resin (P2), having a solids content of 100 wt %. The polymeric resin (P2) has an OH number in a range from 33 to 43 mg of KOH per g of (P2) and an acid number in a range from 13 to 16 mg of KOH per g of (P2). The polyester also has a number-average molecular weight ($M_n$) in the range from 2900 to 3300 g/mol and a weight-average molecular weight (Mw) in the range from 16 000 to 21 000 g/mol, in each case determined by the method of determination specified above.

1.3 Preparing an Inventive Aqueous Dispersion (P) from (P1) and (P2)

33 parts by weight of the solventborne dispersion of the polymeric resin (P1) with a solids content of 69 wt %, obtained as described in section 1.1, are charged to a reactor and heated to a temperature of 100° C. 23 parts by weight of the polymeric resin (P2) with a solids content of 100 wt %, as described in section 1.1, are first melted and, in this molten state, are added slowly at 100° C. to the solventborne dispersion of the polymeric resin (P1), to give a 1:1 mixture of the polymeric resins (P1) and (P2), based in each case on the solids content of the polymeric resins. The resulting mixture is homogenized and cooled to 80° C. At this temperature, 2 parts by weight of dimethylethanolamine (DMEA) are added to the mixture. After this, homogenization is repeated and the resulting mixture is then heated to 90° C. At this point, and at this temperature, 42 parts by weight of deionized water are added with stirring. Subsequently, under reduced pressure, the organic solvents, especially the MIBK present, are removed. Thereafter, deionized water is added to set a solids content in the resultant inventive aqueous dispersion (P), comprising (P1) and (P2), in the range from 45 to 50 wt %, based on the total weight of the aqueous dispersion. The resulting aqueous dispersion (P) is a stable homogenous dispersion with no sediment. The particles contained in the dispersion have an average particle diameter in the range from 150 to 250 nm (this is the average particle diameter based on the sample volume ($D_{50}$ median value) as determined by means of the Mastersizer 2000 instrument from Malvern Instruments Ltd, UK, by laser diffraction in ethanol).

1.4 Preparation of a Further Polymeric Resin (P2)

A polyester is used as a further polymeric resin (P2). This polyester is prepared by combining the components stated below with stirring by means of a dissolver in the order stated: ethylene glycol (8.35 g), trimethylolpropane (1.97 g), neopentyl glycol (27.66 g), isoterephthalic acid (33.79 g), adipic acid (5.31 g) and hexahydrophthalic anhydride (22.78 g). Fastcat® 4100 (0.13 g) is used as a catalyst. The components used are introduced here into a reactor, the resulting mixture is heated to 230-250° C., and is melted with stirring in the process. Where appropriate, water of reaction formed is removed by distillation. This gives a polyester as further polymeric resin (P2), having a solids content of 100 wt %. The polyester has hydroxyl groups and an acid number of <25 mg KOH per g of polyester.

1.5 Preparing a Further Inventive Aqueous Dispersion (P) from (P1) and (P2)

33 parts by weight of the solventborne dispersion of the polymeric resin (P1) with a solids content of 69 wt %, obtained as described in section 1.1, are initially charged in a reactor and heated to a temperature of 100° C. 23 parts by weight of the polymeric resin (P2) with a solids content of 100 wt %, as described in section 1.4, are first melted and, in this molten state, are added slowly at 100° C. to the solventborne dispersion of the polymeric resin (P1), to give a 1:1 mixture of the polymeric resins (P1) and (P2), based in each case on the solids content of the polymeric resins. The resulting mixture is homogenized and cooled to 80° C. At this temperature, 2 parts by weight of dimethylethanolamine (DMEA) are added to the mixture. After this, homogenization is repeated and the resulting mixture is then heated to 90° ° C. At this point and at this temperature, 42 parts by weight of deionized water are added with stirring. Subsequently, under reduced pressure, the organic solvents, especially the MIBK present, are removed. Thereafter, deionized water is added to set a solids content in the resultant inventive aqueous dispersion (P), comprising (P1) and (P2), in the range from 44 to 50 wt %, based on the total weight of the aqueous dispersion. The resulting aqueous dispersion (P) is a stable homogenous dispersion with no sediment. The particles contained in the dispersion have an average particle diameter in the range from 150 to 250 nm (this is the average particle diameter based on the sample volume ($D_{50}$ median value) as determined by means of the Mastersizer 2000 instrument from Malvern Instruments Ltd, UK, by laser diffraction in ethanol).

1.6 Preparing a Non-Inventive Aqueous Dispersion (P) from (P1) and (P2) (Comparative Dispersion V)

The solventborne dispersion of the polymeric resin (P1), described in section 1.1, is admixed with deionized water and under reduced pressure the organic solvents included therein are removed. Thereafter the deionized water is added to set a solids content in the resultant aqueous dispersion of the polymeric resin (P1) of 44 wt %, based on the total weight of the aqueous dispersion. 52.3 parts by weight of this aqueous dispersion of the polymeric resin (P1) with a solids content of 44 wt %, are initially charged in a reactor and heated to a temperature of 80° C. 23 parts by weight of the further polymeric resin (P2) as described in section 1.4, with a solids content of 100 wt %, are added in pelletized form to the aqueous dispersion of the polymeric resin (P1), to give a 1:1 mixture of the polymeric resins (P1) and (P2), based in each case on the solids content of the polymeric resins. At this temperature and with stirring, 2 parts by weight of dimethylethanolamine (DMEA) are added to the mixture. This is followed by stirring, and the resulting mixture is then heated to 90° ° C. Following that 42 parts by weight of deionized water are added to set a solids content in the resulting aqueous comparative dispersion, comprising (P1) and (P2), in the range from 44 to 50 wt %, based on the total weight of the aqueous dispersion. The resultant aqueous comparative dispersion is inhomogeneous and the appearance of a significant sediment is observed. The particles contained in the dispersion have an average particle diameter >1 μm. The comparative dispersion, which is therefore not produced by means of the process for preparing the aqueous dispersions of the invention, comprising at least the steps (1), (2), (3) and (4), therefore differs substantially in its properties from the inventive aqueous dispersion (P) as described in section 1.5.

2. Preparation of an Inventive Aqueous Coating Composition and a Comparative Coating Composition 2.1 an exemplary inventive aqueous coating composition B1 is prepared, comprising as binder component the inventive aqueous dispersion (P) described in section 1.3.

B1 is prepared with stirring and mixing by means of a dissolver, by combining the components identified in Table 1 (items 1 to 7) in that order. This aqueous dispersion (P) corresponds in each case to the dispersion (P) described in section 1.3.

TABLE 1

| Item | Components | Fraction of respective component in B1 in wt %, based in each case on the total weight of the coating composition B1 |
|---|---|---|
| 1 | aqueous dispersion (P) | 25.00 wt % |
| 2 | wetting and dispersing agent | 7.92 wt % |
| 3 | defoaming agent | 0.42 wt % |
| 4 | pigment | 31.67 wt % |
| 5 | aqueous dispersion (P) | 28.65 wt % |
| 6 | crosslinking agent | 6.13 wt % |
| 7 | defoaming agent | 0.21 wt % |

The wetting and dispersing agent used is the commercially available product Disperbyk® 190, and the defoaming agent used is the commercially available product Byk® 033 (solids content >97 wt %). TiO$_2$ is used as pigment. The crosslinking agent used is a methylated melamine-formaldehyde resin which is available commercially from BASF under the name Luwipal® 066 LF.

The components of items 1-7 in Table 1, used for preparing the aqueous coating composition B1, are mixed with one another in a dissolver and then dispersed in a bead mill until an energy input of 75 Wh/kg has been achieved.

2.2 As comparative coating composition V1, a commercially available topcoating composition POLYCERAM® Plus P from BASF Coatings is used. This is not an aqueous coating composition, but rather a conventional, solvent-based coating composition, containing the following components listed in Table 2 below:

TABLE 2

| Components | Fraction of the respective component in V1 in wt %, based in each case on the total weight of the coating composition V1 |
|---|---|
| Polyester as binder component | 26.06 wt % |
| Additives (defoaming agent, wax, flow control assistant) | 2.28 wt % |
| Melamine- and urea-based crosslinking agent | 7.56 wt % |
| Inorganic solids (pigments, extenders, salts) | 26.77 wt % |
| Defoaming agent | 0.15 wt % |
| Organic solvents (alcohols, paraffins, aldehydes, aromatics, alkylamines and alkyl acetates) | 36.69 wt % |
| Deionized water | 0.49 wt % |

The polyester used as binder component is a mixture of different polyesters, with at least one of these polyesters being a polyester (P2). V1 contains no polymeric resin (P1).

3. Production of Substrates Coated with an Inventive Aqueous Coating Composition B1 or a Comparative Coating Composition V1

An OE HDG 5 galvanized steel sheet from Chemetall (thickness 0.81 mm; area: 10.5 cm·30 cm) is subjected to alkaline cleaning using the commercially available Gardoclean® S5160 product from Chemetall, and is subsequently pretreated with the commercially available Granodine® 1455T product from Henkel. Subsequently a primer coat is applied, using a commercially available primer (Coiltec® Universal P CF from BASF), to a metal sheet which has been cleaned and pretreated in this way, followed by drying in a drawer oven at a substrate temperature of 208° C. for a period of 49 s. The primer coat has a dry film thickness of 5 μm. The galvanized steel sheet, cleaned, pretreated, and given a primer coat as above, is referred to hereinafter as sheet T. Using a coating rod, the prepared coating compositions B1 or V1 are in each case subsequently applied as topcoat to a thus-coated sheet T which is then cured under exemplary coil coating conditions, namely at a substrate temperature of 243° C. in a drawer oven for a time of 63 s. The dry film thickness of the resulting topcoat is 20 μm in each case. The sheets TB1 and TV1 are obtained.

The results of a number of performance tests used to investigate the examples TB1 and TV1 are set out in Table 3 below. Each of the individual parameters is determined here by the method indicated above.

TABLE 3

| | metal sheet TB1 coated with B1 as topcoat | metal sheet TV1 coated with V1 as topcoat |
|---|---|---|
| Popping | none | none |
| T-bend | 3.0 | 2.5 |

TABLE 3-continued

|  | metal sheet TB1 coated with B1 as topcoat | metal sheet TV1 coated with V1 as topcoat |
|---|---|---|
| Tape | 1.0 | 1.0 |
| MEK | >300 | >300 |
| Gloss at 60°, determined after UVCON testing over 1008 h | 70.3 | —* |
| Scratch corrosion after 360 h neutral salt spray test [mm] | 1.1 | 0.5 |
| Scratch corrosion after 1008 h neutral salt spray test [mm] | 2.1 | 2.0 |
| Edge corrosion after 360 h neutral salt spray test [mm] | 1.6 | 1.9 |
| Edge corrosion after 1008 h neutral salt spray test [mm] | 5.5 | 5.1 |

*= not determined

From the results in Table 3 it is evident in particular that when using the inventive coating composition B1 as topcoat for a substrate T, it is possible to prevent the incidence of surface defects such as popping marks. While this is also observed for the comparative composition V1, it is nevertheless achieved therein only through the presence of the high fractions of relatively nonvolatile organic solvents present in that composition, something which is undesirable on environmental grounds.

The invention claimed is:

1. An aqueous dispersion (P), comprising:
   a polymeric resin (P1), and
   a polymeric resin (P2) which is different from the polymeric resin (P1), wherein
   the polymeric resin (P1) is a copolymer obtained by a copolymerization of ethylenically unsaturated monomers in the presence of at least one polyurethane resin comprising polymerizable carbon double bonds, and
   the polymeric resin (P2) is a polyester comprising functional hydroxyl groups and which has an acid number of <20 mg of KOH per g of the polymeric resin (P2), the polymeric resin (P2) being obtained from: at least one polycarboxylic acid and/or an anhydride thereof; and at least one alcohol which consists of at least one polyol, and
   wherein the aqueous dispersion (P) is obtained by a process comprising:
   (1) preparing a dispersion or a solution comprising the polymeric resin (P1) in at least one organic solvent,
   (2) preparing a mixture of the dispersion or the solution comprising the polymeric resin (P1) and a melt or a solution comprising the polymeric resin (P2),
   (3) adding water to the mixture, and
   (4) removing the organic solvent from the mixture, to obtain the aqueous dispersion (P).

2. The aqueous dispersion (P) according to claim 1, wherein the relative weight ratio of the polymeric resin (P1) to the polymeric resin (P2), based on the solids content thereof, in the dispersion (P) is in a range from 2:1 to 1:2.

3. The aqueous dispersion (P) according to claim 1, wherein the polymeric resin (P2) has an acid number of <18 mg of KOH per g of the polymeric resin (P2).

4. The aqueous dispersion (P) according to claim 1, wherein the polymeric resin (P2) has a hydroxyl number of <50 mg of KOH per g of the polymeric resin (P2).

5. The aqueous dispersion (P) according to claim 1 which has a solids content in the range from 35 to 75 wt %, based on the total weight of the aqueous dispersion (P).

6. The aqueous dispersion (P) according to claim 1, wherein the polymeric resin (P1) has a weight-average molecular weight ($M_w$) in a range from 15000 to 60000 g/mol and the polymeric resin (P2) has a weight-average molecular weight ($M_w$) in a range from 5000 to 40000 g/mol.

7. An aqueous coating composition, comprising:
   (A1) the aqueous dispersion (P) according to claim 1,
   (A2) at least one crosslinking agent,
   (A3) at least one pigment, and
   (A4) optionally at least one additive.

8. The aqueous coating composition according to claim 7, which has a combined solids content of the polymeric resin (P1) and the polymeric resin (P2) in a range from 20 to 35 wt %, based on the total weight of the aqueous coating composition.

9. The aqueous coating composition according to claim 7, wherein the crosslinking agent (A2) is a melamine-formaldehyde condensation product.

10. The aqueous coating composition according to claim 7, which comprises the at least one pigment (A3) in an amount in a range from 25 to 45 wt %, based on the total weight of the aqueous coating composition.

11. A topcoat comprising the aqueous coating composition according to claim 7 in a cured form.

12. A process, comprising partially or fully coating a substrate metal surface, coated with at least one primer coat, with the aqueous coating composition according to claim 7 as a topcoat.

13. A topcoat obtained by the process according to claim 12.

14. A partially or fully coated substrate metal surface obtained by the process according to claim 12.

15. The aqueous coating composition according to claim 7, wherein the at least one additive (A4) is present.

16. The aqueous coating composition according to claim 7, wherein the crosslinking agent (A2) is an alkylated melamine-formaldehyde condensation product.

17. A process for partially or fully coating a substrate metal surface, the process comprising:
   (a) optionally cleaning the substrate metal surface to remove soiling,
   (b) optionally applying at least single-sidedly a pretreatment coat to the substrate metal surface,
   (c) applying at least single-sidedly a primer coat to the substrate metal surface or to the optionally applied pretreatment coat, and optionally curing the primer coat,
   (d) partially or fully coating the substrate metal surface, coated with the primer coat, with the aqueous coating composition according to claim 7 as a topcoat
   (e) curing the applied topcoat.

18. The process according to claim 17, wherein at least one selected from the group consisting of
cleaning the substrate metal surface,
applying at least single-sidedly a pretreatment coat,
applying at least single-sidedly a primer coat to the applied pretreatment coat, and curing the primer coat
is performed.

19. A topcoat obtained by the process according to claim 17.

20. A partially or fully coated substrate metal surface obtained by the process according to claim 17.

* * * * *

UNITED STATES PATENT AND TRADEMARK OFFICE
CERTIFICATE OF CORRECTION

PATENT NO. : 10,717,110 B2
APPLICATION NO. : 15/310640
DATED : July 21, 2020
INVENTOR(S) : Frank Joege et al.

It is certified that error appears in the above-identified patent and that said Letters Patent is hereby corrected as shown below:

On the Title Page

Column 1, Item (51), under "Int. Cl.", Lines 2-7, should read
-- (51) Int. Cl.
*C08G 18110*  (2006.01)
*B05D 7100*   (2006.01)
*C09D 167102* (2006.01)
*C08G 18168*  (2006.01)
*C08F 283/00* (2006.01)
*B05D 3/00*   (2006.01)
*B05D 7/00*   (2006.01) --, In the Specification Column 4, Line 37, "25 m" should read -- 25 µm --, Column 13, Line 5, "80°" should read -- ≥80° --, Column 13, Line 5, "110°" should read -- ≥110° --, Column 13, Line 6, "130°" should read -- ≥130° --, Column 17, Line 31, "topcoat," should read -- topcoat, and --, Column 19, Line 6, "110°" should read -- ≥110° --, Column 19, Line 6, "140°" should read -- ≥140° --, Column 19, Line 7, "170°" should read -- ≥170° --, Signed and Sealed this
Second Day of March, 2021

Drew Hirshfeld
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 10,717,110 B2

Column 22, Line 20, "Rimer" should read -- Römer --,

Column 23, Line 26, "1350," should read -- 135°, --,

Column 23, Line 66, "m," should read -- μm, --.